(12) United States Patent
Neumann et al.

(10) Patent No.: US 11,596,874 B2
(45) Date of Patent: *Mar. 7, 2023

(54) WATER PRODUCTION, FILTRATION AND DISPENSING SYSTEM

(71) Applicant: Infinite Water, Inc., Centralia, IL (US)

(72) Inventors: Arthur Neumann, Centralia, IL (US); Robert K. Waite, Holden, MA (US)

(73) Assignee: Infinite Water, Inc., Holiday, FL (US)

( * ) Notice: Subject to any disclaimer, the term of this patent is extended or adjusted under 35 U.S.C. 154(b) by 319 days.

This patent is subject to a terminal disclaimer.

(21) Appl. No.: 15/664,455

(22) Filed: Jul. 31, 2017

(65) Prior Publication Data

US 2017/0326470 A1 Nov. 16, 2017

Related U.S. Application Data

(63) Continuation of application No. 13/621,419, filed on Sep. 17, 2012, now Pat. No. 9,731,218.

(Continued)

(51) Int. Cl.

| | | |
|---|---|---|
| *B01D 5/00* | (2006.01) | |
| *C02F 1/00* | (2023.01) | |
| *C02F 1/02* | (2023.01) | |
| *C02F 1/28* | (2023.01) | |
| *C02F 1/32* | (2023.01) | |
| *C02F 1/78* | (2023.01) | |
| *C02F 9/00* | (2023.01) | |
| *F25B 21/02* | (2006.01) | |

(52) U.S. Cl.
CPC ......... B01D 5/0054 (2013.01); B01D 5/0003 (2013.01); B01D 5/0039 (2013.01); C02F 1/008 (2013.01); C02F 1/02 (2013.01); C02F 1/283 (2013.01); C02F 1/32 (2013.01); C02F 1/78 (2013.01); C02F 9/005 (2013.01); C02F 2209/001 (2013.01); C02F 2209/008 (2013.01); C02F 2209/02 (2013.01); C02F 2209/38 (2013.01); C02F 2209/42 (2013.01); C02F 2209/445 (2013.01); F25B 21/02 (2013.01); Y02A 20/00 (2018.01)

(58) Field of Classification Search
CPC ..... Y02A 20/109; B01D 5/0042; F25B 21/02; C02F 9/005
See application file for complete search history.

(56) References Cited

U.S. PATENT DOCUMENTS

| | | | | |
|---|---|---|---|---|
| 5,824,243 A | * | 10/1998 | Contreras ............... | B01F 25/53 261/36.1 |
| 6,058,718 A | * | 5/2000 | Forsberg ................ | C02F 9/005 62/125 |

(Continued)

*Primary Examiner* — Ryan B Huang
(74) *Attorney, Agent, or Firm* — Prince Lobel Tye LLP; Brian M. Dingman

(57) ABSTRACT

A water production system with a thermal separation device that defines a cold region and a hot region, a fluid-air heat exchanger located remotely from the thermal separation device and exposed to air, and a fluid circulation loop that thermally connects the cold region of the thermal separation device to the fluid-air heat exchanger so as to cool the fluid-air heat exchanger and condense water from ambient air to produce water pure enough so that with further treatment it can be made potable. Also disclosed are filtration and dispensing features that are appropriate for a potable water supply.

15 Claims, 6 Drawing Sheets

Related U.S. Application Data

(60) Provisional application No. 61/602,347, filed on Feb. 23, 2012, provisional application No. 61/602,330, filed on Feb. 23, 2012.

(56) References Cited

U.S. PATENT DOCUMENTS

| | | | | |
|---|---|---|---|---|
| 6,932,889 B1* | 8/2005 | Holcomb | ............ | B01D 1/04 |
| | | | | 203/11 |
| 7,293,420 B2* | 11/2007 | Max | ............ | B01D 53/265 |
| | | | | 62/272 |
| 2006/0059922 A1* | 3/2006 | Anderson | ............ | B01D 5/0039 |
| | | | | 62/93 |
| 2006/0060233 A1* | 3/2006 | Lakdawala | ............ | B01D 5/0003 |
| | | | | 134/169 A |
| 2009/0065173 A1* | 3/2009 | Wiggs | ............ | F25B 30/06 |
| | | | | 165/45 |

* cited by examiner

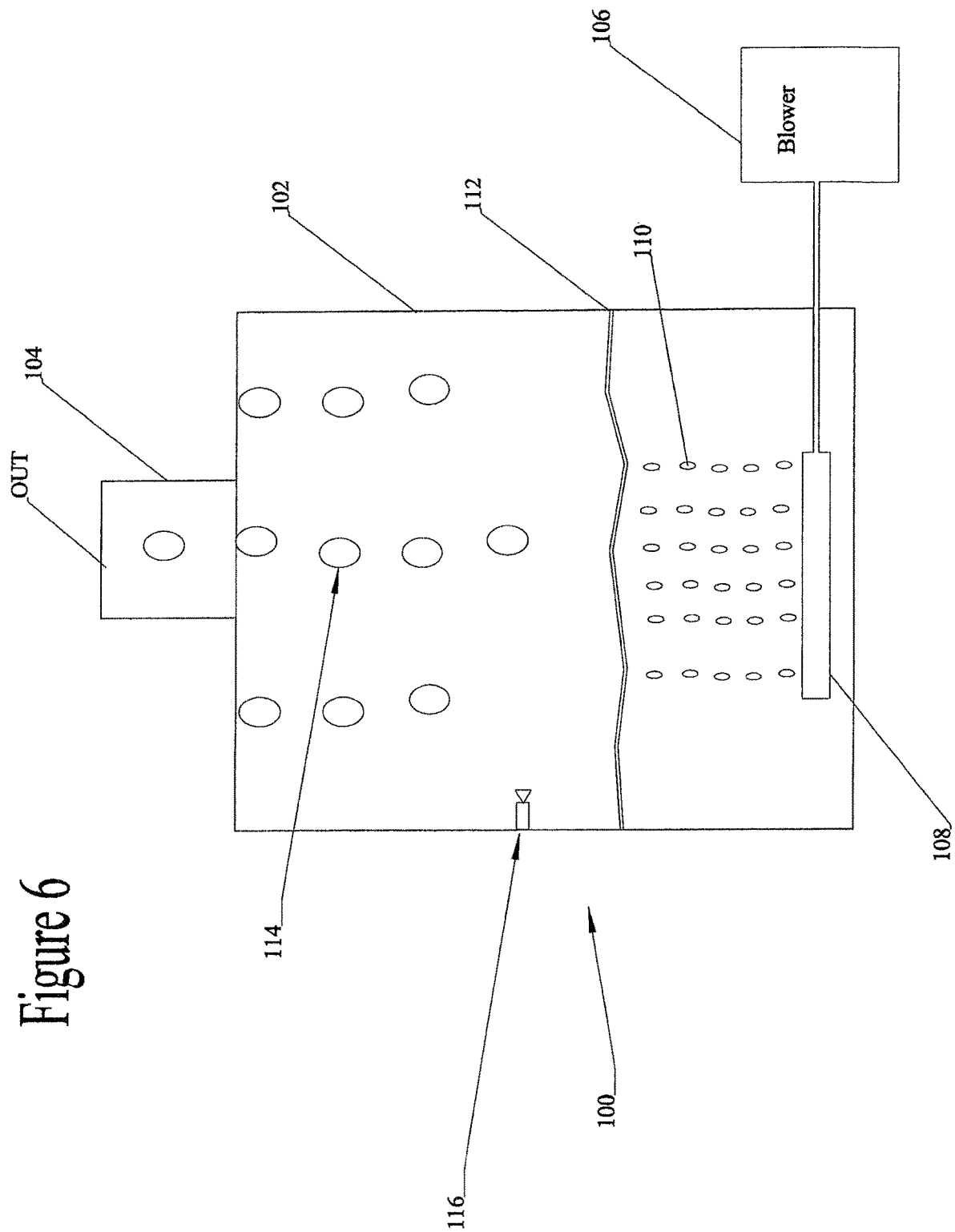

WATER PRODUCTION, FILTRATION AND DISPENSING SYSTEM

CROSS-REFERENCE TO RELATED APPLICATIONS

This application is a continuation of and claims priority of application Ser. No. 13/621,419, filed on Sep. 17, 2012, which itself claimed priority of Provisional Patent Application No. 61/602,330, filed on Feb. 23, 2012, and Provisional Patent Application No. 61/602,347, filed on Feb. 23, 2012.

BACKGROUND

Existing thermoelectric (TE) (Peltier Effect) devices designed to extract water from ambient humidity through condensation typically use finned metal heat exchangers which are constrained to be in direct contact with or in close proximity to the faces of the TE element(s). This constrains the location of the heat exchangers in two ways—each heat exchanger must be co-located with its assigned (hot or cold) side of the TE device, and the two sides must therefore be separated by the thickness of the TE device, which is a fraction of an inch. These constraints make for difficult design choices in both location of the heat exchangers and air handling. These difficulties have limited the application of TE devices in water production machines to date.

Water produced by condensation from ambient air contains various impurities including dust particles, microbes and viruses from the air, and dissolved gaseous compounds which affect its taste. Municipal and private sources of potable water contain dissolved solids and other compounds which affect taste and in some cases microbes and viruses.

In order to remove these taste- and safety-affecting materials various types of filtering systems have been used. An effective filtration and distribution system for potable water must remove dissolved taste and odor causing chemicals, dissolved solids, and either kill or prevent microbes, molds, and viruses from reproducing and remove the detritus left behind by so doing. If potable water is to be stored after filtration it must be re-filtered before dispensing. Good practice dictates that stored water be subjected to disinfection and recirculated through the filtration system on a regular basis to eliminate detritus and disinfection byproducts.

SUMMARY

Disclosed herein is a water production system that uses any electrically forced means of establishing separate hot and cold areas and that does not use a compressor, which will at times be referred to herein as a thermal separation device. Present-day examples of thermal separation devices include thermoelectric (Peltier Effect), thermoacoustic, electron tunneling, vortex chilling and inverse barocaloric effect cooling devices. The subject system incorporates a fluid-based heat exchanger on either the cold or hot side, or on both sides, of a thermal separation device coupled to a remote fluid-air heat exchanger by a fluid (typically either a liquid, or a fluid that undergoes a phase change) that is moved through a pipe or tube. This arrangement, while still demanding a heat exchanger at the face of the thermal separation device, provides multiple benefits. The fluid-based heat exchanger that is thermally coupled to the thermal separation device can be much smaller than an equivalent air-based heat exchanger; no air flow to the location of the fluid-based heat exchanger is needed; and a fluid-based heat exchanger can be constructed to be more effective than an air-based heat exchanger of similar size. One or a plurality of other heat exchangers may be used, alone or in conjunction with a fluid-to-air heat exchanger to transfer heat from the fluid to ambient air or other heat sink(s), such as a geothermal well. These other heat exchangers, transferring heat out of the moving fluid, may be located so as to maximize a combination of convenience, efficiency, cost and various other factors.

This disclosure features a water production system comprising a thermal separation device and a condenser thermally connected together by a circulated fluid to condense water from ambient air to make water pure enough so that with further treatment it can be made potable. The heat from the heated side of the thermal separation device may be exchanged with the environment remotely via a pumped fluid. The working fluid may be, for example, water, ethylene glycol alone or in combination with water, or silicone-based wide temperature range fluids. The working fluid may undergo a phase change between liquid and gaseous states. The air exiting the condenser may be routed via one or more ducts or by direction of travel to blend with the air used to cool the hot side of the thermal separation device.

The hot side of the thermal separation device may be thermally coupled to the air outside the structure where the water production system is located through an intermediate working fluid. The hot side of the thermal separation device may be placed in a fixed location to benefit from prevailing wind conditions. The hot side of the thermal separation device may instead be placed in a movable location and its position and/or orientation controlled to extract benefit from prevailing wind conditions. The water production system may be located in a motor vehicle, aircraft, or watercraft, in which case the hot side of the thermal separation device can be thermally coupled to the air outside the vehicle where the water production system is located through an intermediate working fluid. The heat exchanger used to cool the hot side of the thermal separation device may be located to take advantage of the slipstream generated by vehicular motion.

The hot side of the thermal separation device may be thermally coupled to a geothermal heat transfer means through an intermediate working fluid. The hot side of the thermal separation device may be thermally coupled to a source of moving water or a body of still water large enough to be an effectively infinite heat sink through an intermediate working fluid. The hot side of the thermal separation device may be additionally thermally coupled to the ambient air through an intermediate working fluid. There may be separate loops of intermediate working fluid to transfer heat to ambient air and another heat sink. There may be one continuous loop of intermediate working fluid to transfer heat to ambient air and another heat sink.

The recirculating flows of heat transfer fluid may be preset to constant values for the implementation. The recirculating flows of heat transfer fluid may flow through thermally insulated pipe and/or tubing. One or more of the recirculating flows of heat transfer fluid may be controlled based on the rate of heat transfer required, response time desired, and other system parameters. The flow of air over the condensing element may be controlled to maintain the condensing element at a desired temperature. The desired temperature may be a temperature below the dew point of the input air.

The accumulator may be a part of the condensing element housing. The pumps for the hot and cold side heat transfer fluid may be operated from a single power source. The pumps for the hot and cold side heat transfer fluid may be mounted in the same housing. The portions of the condenser which contact produced water may contain or be coated with an antibacterial agent. The portions of the condenser which contact produced water may be coated with a hydrophobic coating.

The inlet air may pass through an air filter upwind of the condenser. The correct installation and/or operation of the air filter may be monitored by an electronic control system. The elapsed installation time of the air filter may be monitored by the control system. The amount of inlet air which has passed through the air filter may be monitored by the control system. The electronic control system may carry out various actions to prevent water production if the air filter is not correctly installed and/or is not correctly operating or has passed its installed life or has passed its working life.

The system may collect various data for analysis. The collected data may be transmitted by wire or to an optical or radio receiver outside the water production system. The collected data may be transferred for analysis by a removable electronic storage medium. One method of controlling the temperature of the condenser may be to control the voltage, current, or power applied to the thermal separation device. One method of controlling the voltage, current, or power applied to the thermal separation device may be to use pulse-width modulation.

The disclosure further comprises a water filtering and dispensing system (FDS) which makes use of water produced locally when it is available in sufficient quantities and water from an external pressurized source of potable water when needed.

A feature of the FDS is the use of an accumulator tank connected to an accessory tank through a "quick disconnect" fitting containing check valves at each interface to prevent water from being spilled when the accumulator is removed. Another feature is the location of all electrical connections separate from the accumulator tank. A further feature of the FDS is a connection to an external supply of potable water which incorporates a pressure reducer and a backflow preventer. A configuration of piping and electrically controlled valves allows automatic selection of the water source and user selection of dispensing temperature.

BRIEF DESCRIPTION OF THE DRAWINGS

The foregoing and other features and advantages will become apparent from the following description in conjunction with the accompanying drawings. The drawings are not necessarily to scale; emphasis has instead been placed upon illustrating the principles of the disclosure.

FIG. 6 is a schematic diagram of a water humidification and condensing system.

Figure 1:
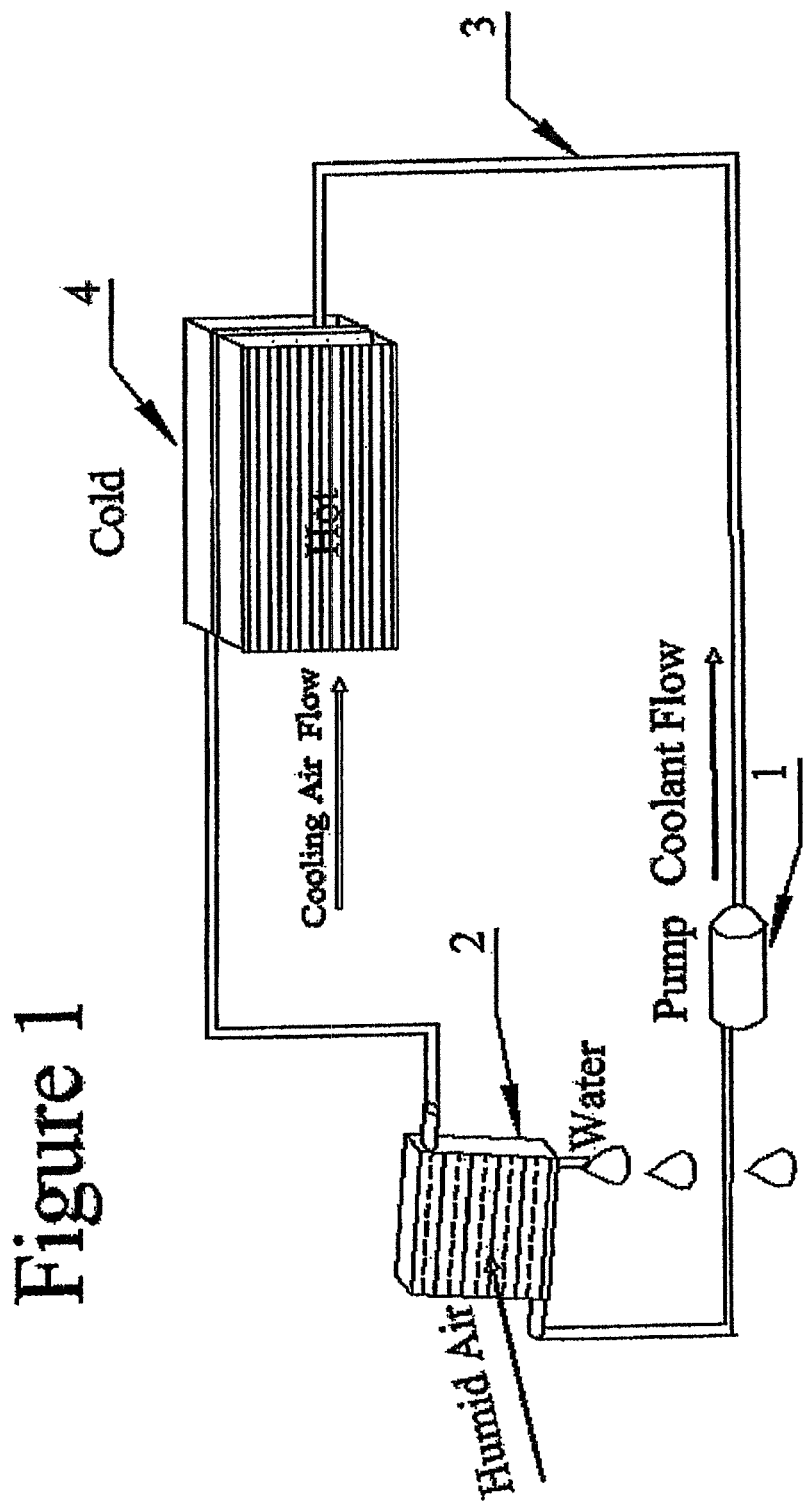
FIG. 1 is a block diagram of a water production system.
Figure 2:
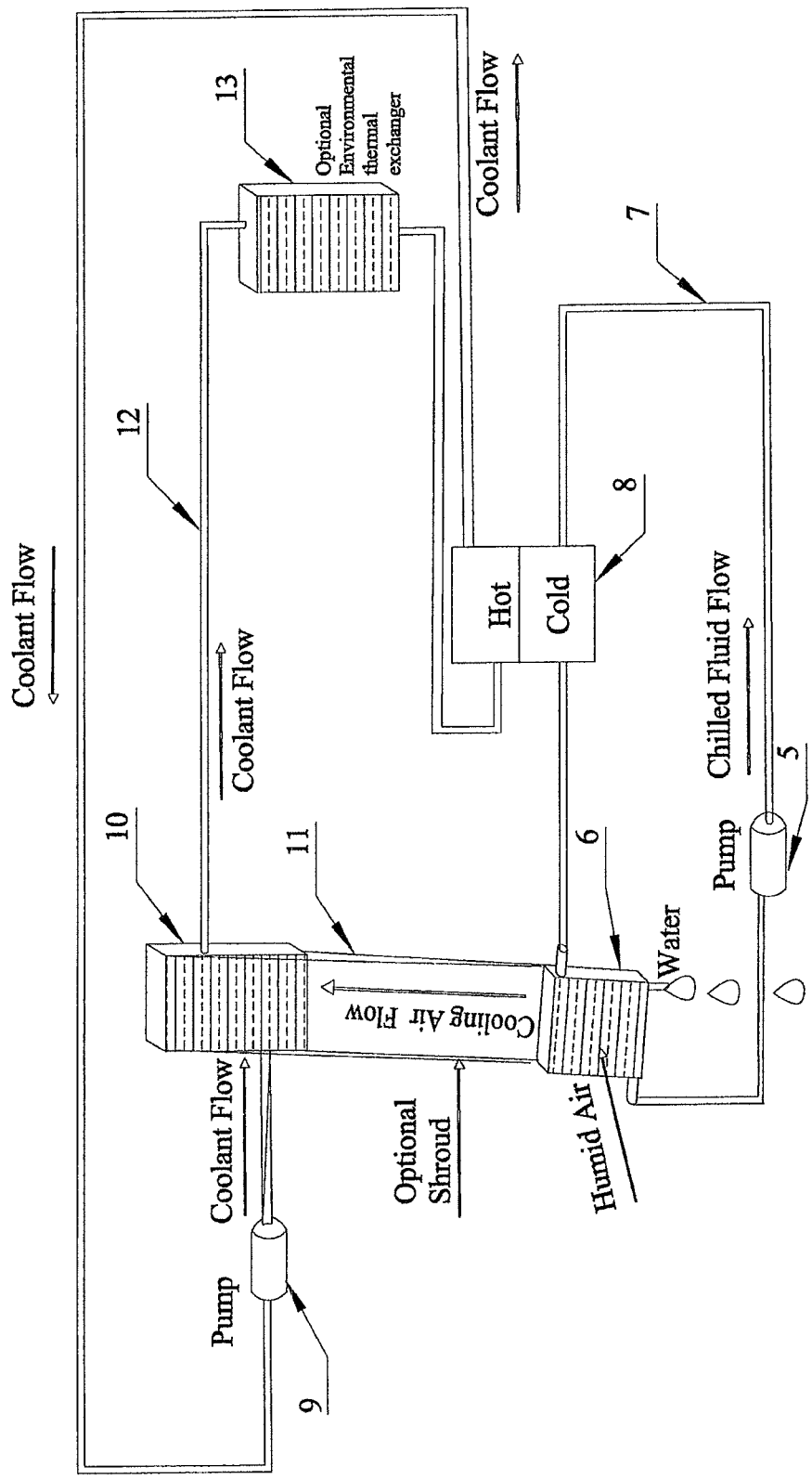
FIG. 2 is a block diagram of a more detailed embodiment of a water production system.
Figure 4:
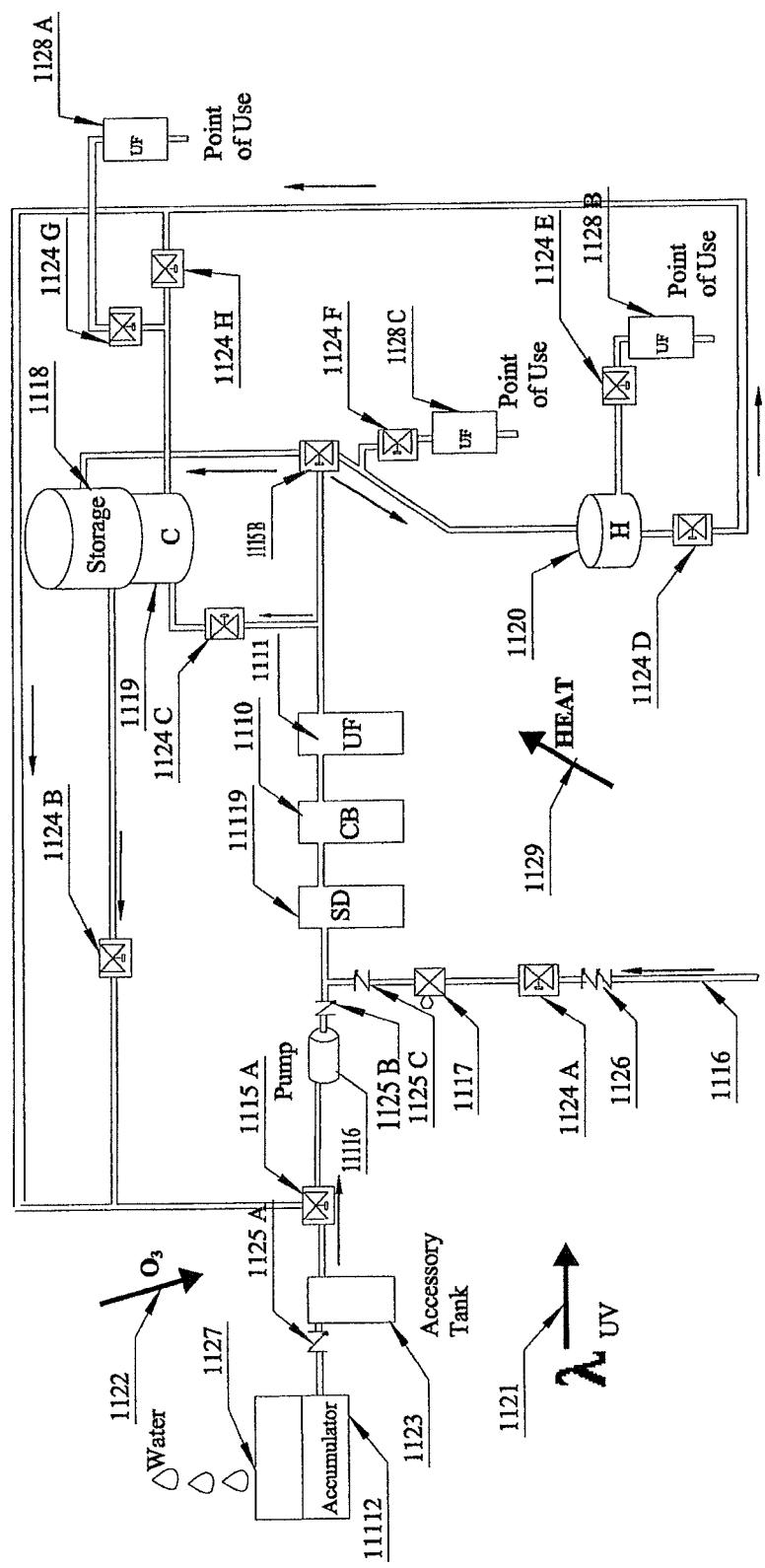
FIG. 4 is a diagram of a water accumulation, filtering and dispensing system.
Figure 5:
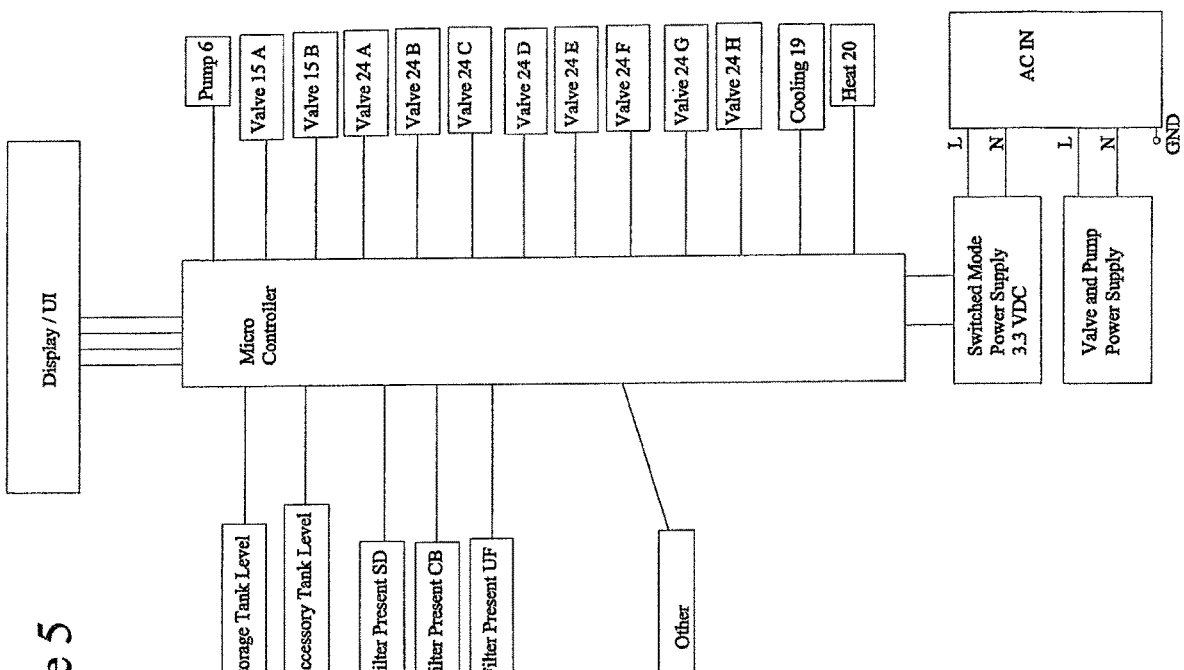
FIG. 5 is a block diagram of a control system showing the relationships of the various sensors, valves, pump and user interface/display to a typical microcomputer-based electronic controller.

The numbered callouts for FIG. 1:
1—Chilled fluid pump
2—Fluid-to-air heat exchanger used to cool the inlet air with chilled fluid from the cold side of the thermal separation device
3—Chilled fluid piping
4—Thermal separation device The numbered callouts for FIG. 2:
5—Chilled fluid pump
6—Fluid-to-air heat exchanger used to cool the inlet air with chilled fluid from the cold side of the thermal separation device
7—Chilled fluid piping
8—Thermal separation device
9—Coolant pump
10—Liquid to air heat exchanger
11—Optional shroud
12—Coolant piping
13—Environmental heat exchanger The numbered callouts for FIG. 4:
11112—Accumulator tank
11116—Potable water pump
11119—Sediment filter
1110—Carbon block filter
1111—Ultrafilter
1115 A, B—Three-way solenoid valves
1116—External potable water source
1117—Pressure regulator
1118—Storage tank
1119—Chilled water reservoir
1120—Heated water reservoir
1121—UV light
1122—Ozone generating and dispensing sub-system
1123—Accessory tank
1124 A through H—Solenoid valves
1125 A, B, C—Quick-disconnect fittings with check valves
1126—Backflow preventer
1127—Sediment filter/strainer
1128 A, B, C—Ultrafilters at points of use
1129—In-line or tank heater The numbered callouts for FIG. 6:
100—Accumulator tank
102—Potable water pump
104—Air exit
106—Blower
108—Air stone
110—Air bubbles
112—Standing water
114—Water droplets
116—Spray nozzle

DETAILED DESCRIPTION

Referring to FIG. 1, in one embodiment the water production system comprises at least a thermal separation device 4, one or more fans and ductwork (not shown) to move humid air and cooling air, a pump 1 to circulate chilled coolant through recirculating loop 3 which may be thermally insulated and through the cold side of the thermal separation device 4 and thence through condenser 2, and an electronic control system with sensors for fluid levels, flow, and temperature as needed and a variable power supply (not shown in this figure). The coolant may consist of water, water containing an anti-freeze substance, silicone-based fluid, or a fluid which undergoes phase changes at the heat exchangers. Cooling air is directed to a finned heat sink attached to the hot side of thermal separation device 4.

In operation, when power is applied to the thermal separation device, a temperature differential is created between the hot side and the cold side. The cold side is thermally connected to a fluid to air heat exchanger through piping 3 and heat is transferred to the cold side from the coolant circulated by pump 1. This coolant flows through a fluid-to-air heat exchanger (condenser 2) where heat is absorbed from the input air which may optionally be filtered. When enough heat is absorbed from the input air to lower its temperature below its dew point, water condenses and moves by gravity for use.

Optionally, referring to FIG. 2, the hot side is thermally connected to a fluid heat exchanger through piping 12 which may be thermally insulated and the hot side heat is transferred to the coolant circulated by pump 9. This coolant flows through a fluid-to-air heat exchanger 10 and heat is transferred to the ambient air.

Pumps 5 and 9 may optionally operate from a common power source and/or be located within a common housing.

Optionally, the condenser 6 may be located so that air which has passed through it and has been cooled is combined with the air impinging on the fluid-to-air heat exchanger 10 so as to use this pre-cooled air to remove heat from the hot side and increase the efficiency of the system. This cooled air may be ducted to fluid-to-air heat exchanger 10 by duct 11 or simply be allowed to impinge on fluid-to-air heat exchanger 10 or mix with the ambient air directed at fluid-to-air heat exchanger 10.

Optionally, the fluid-to-air heat exchanger 10 may be located on a fixed or movable platform outside the building, watercraft, or vehicle housing the other elements of the water production system so as to benefit from outside air and any movement it may exhibit and increase the efficiency of the system. This movable platform may change orientation and/or location in response to system conditions and outside air conditions under control of the control system. The fluid-to-air heat exchanger 10 may be located at above or below the water line when located in a watercraft.

A further option is the inclusion of an environmental thermal exchanger 13. The environmental thermal exchanger may consist of any heat exchange technology and is intended to dump heat to an external environmental sink (that is typically essentially an infinite sink) such as a geothermal volume (e.g., a well), or a body of water, river, or stream. In installations where a geothermal system already exists, the environmental thermal exchanger 13 can be a fluid-to-fluid heat exchanger with geothermal system fluid pumped through one side and coolant pumped by pump 9 through the other.

The system may also optionally be configured so that the fluid-to-air heat exchanger 10 is not used and pump 9 circulates coolant only through the thermal separation device hot side heat exchanger and the environmental thermal exchanger 13.

Optionally, all surfaces which contact produced water may be enhanced with agents providing hydrophobic and/or antibacterial properties.

Figure 3:
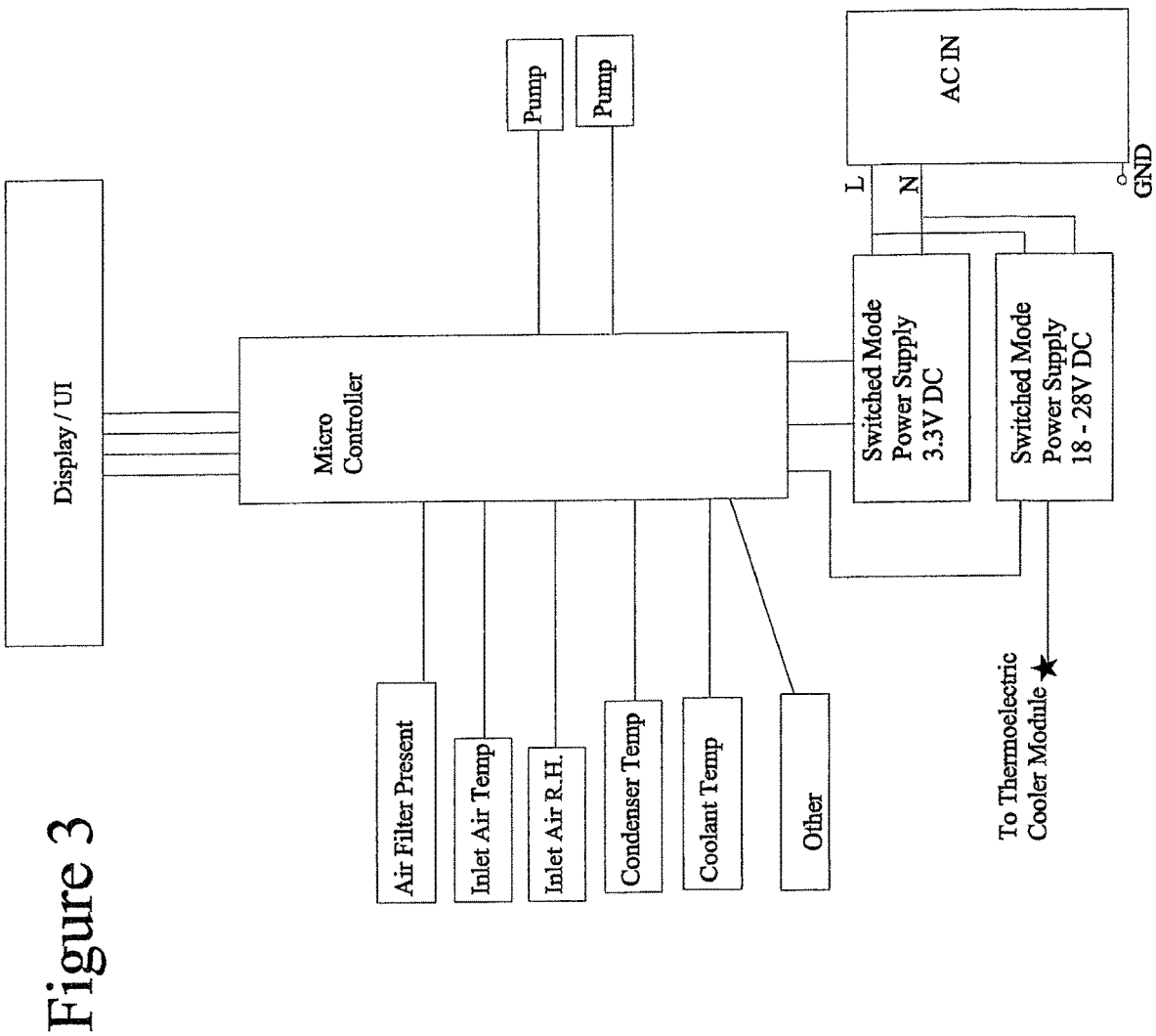
FIG. 3 is a block diagram of a control system.

For purposes of measurement and control, certain sensors and electronic controls are used. Referring to FIG. 3, the water production system is equipped with a control system. This version of such a system comprises a microcomputer with support electronics for supplying and controlling power, signal conditioning, and data storage. Included in the microprocessor are an A/D converter, real-time-clock, and various other typical peripherals.

The condenser 6 of FIG. 2 has a temperature sensor suitable for reporting the average temperature of the air contact surface.

A humidity sensor and a temperature sensor are located proximal to the condenser 6 of FIG. 2 in the inlet air stream to report the relative humidity and temperature and allow calculation of the dew point of the inlet air.

A temperature sensor may be thermally connected to the hot side of the thermal separation device and its readings used to modulate coolant flow either by changing the operating speed of pump 5 of FIG. 2 or by controlling an adjustable valve to control the output of pump 5 of FIG. 2, or both.

Various other switches, temperature and flow sensors may be installed as needed to gain data to allow for more efficient and/or safer operation such as sensing means to inform the control system that the air filter is installed correctly and functioning within its installed life and working life limits.

The control system may control the speed of any fans and pumps as well as the power applied to the thermal separation device. Power may be controlled by any combination of applied voltage, allowed current consumption, and total power consumption. Any of applied voltage, allowed current consumption, and total power consumption may be controlled either by continuous or pulse-width-modulation methods.

A further option is for the control system to collect data regarding the operation of the water production system for external evaluation. This data may be transferred by wire, radio or optical transmission, or removal of an electronic memory device.

One Preferred Embodiment

Referring to FIG. 2, both the hot and cold sides of a thermal separation device 8 are equipped with heat exchangers which transfer heat respectively away from the hot side and into the cold side.

To remove heat from the hot side of the thermal separation device 8, a working fluid is pumped by pump 9 in a closed loop 12 through a fluid-to-air heat exchanger 10, cooling it, and back through the hot side heat exchanger, gaining heat from the hot side.

To add heat to the cold side of the thermal separation device, a working fluid is pumped by pump 5 in a closed loop 7 through a fluid-to-air heat exchanger (condenser 6) which heats the fluid, and back through the cold side heat exchanger, losing heat to the cold side. This cools the condenser 6 and when cooled below the dew point of the inlet air, water condenses on it.

Both pumps 5 and 9 operate at selected constant rates predetermined to supply adequate flows of working fluid through loops 7 and 12 respectively.

A system of sensors and other electronics (not shown) is used to measure the temperature and relative humidity of the inlet air and the temperature of the condenser 6 and control the rate of flow of the inlet air to maintain the temperature of condenser 6 at a calculated temperature below the dew point of the inlet air.

Liquid water which has condensed on condenser 6 eventually coalesces into drops of sufficient mass to overcome any surface adherence to condenser 6 and they run down and/or fall for use, for example as potable water (typically after appropriate filtration and the like).

Referring to FIG. 4, the accumulator 11112 that receives water condensed on condenser 6 and the accessory tank 1123 are constructed to be of equal heights and fluidly connected near their bases. Ambient temperature water storage tank 1118 is higher than hot 1119 and cold 1120 water dispensing devices or points. Heater 1129 can optionally be included as an in-line or tank heater to sanitize the water. Also, an in-line heater can be used instead of a hot water storage tank.

Because of the physical arrangement of the tanks water will achieve equal levels in accumulator 11112 and the accessory tank 1123 and all water level sensing for the accumulator can be done in the accessory tank, thus freeing the accumulator of sensors, hoses, and electrical wires and facilitating its removal. Because storage tank 1118 is higher than any other point in the piping system, water can flow from it without the need for pressurization and will not flow into it due to gravity.

The accumulator 11112 accepts water produced locally from a thermoelectric water production system falling into it through an antibacterially-coated sediment filter/strainer 1127.

When the supply of locally-produced water is inadequate, the control system selects for water from an external source, which is then pressure regulated under control of the control system for use in the water filtering and dispensing system.

Ultraviolet light at an adequate intensity is allowed to impinge on clear, UV resistant piping between the filters 11119 and 1110 and 1111. The UV light intensity is monitored and system operation is prohibited if the UV intensity is inadequate.

Ozone at an adequate concentration is produced electrically from oxygen present in the air and piped to the accumulator 11112, accessory tank 1123, storage tank 1118, hot tank 1119, and cold tank 1120. The dissolved ozone concentration is monitored and system operation is prohibited if the concentration is inadequate.

Water which has passed through filters 11119, 1110, and 1111 is stored in storage tank 1118, hot tank 1119, and cold tank 1120, which is incorporated into the base of storage tank 1118 and fluidly connected to it; the two can be separated by a liquid-permeable baffle. Piping from the tanks 1118, 1119, 1120 through point of use ultrafilters 1128 A, B, and C and to the points of use is treated with an antibacterial agent.

In addition to controlling operation of the water filtering and dispensing system, the control system monitors the presence, elapsed installed time, and service life of all filters and UV bulbs. The system will shut down if predetermined standards are surpassed.

The water filtering and dispensing system collects and stores in non-volatile memory various data of its operation and use and transmits this information to an outside receiver on command. Should the transmitter fail, the non-volatile memory can be removed and read externally.

Operation of the system shown in FIG. 4 is most conveniently described by discussing the major operational conditions.

Condition 1: (IDLE)

In this condition, the filtration and dispensing system is idle and collecting locally generated water in the accumulator 11112 and accessory tank 1123.

The control system is monitoring the water level and the rate of water production in accessory tank 1123.

Valve 1115 A is set so that water flows from the accessory tank 1123 to the pump 11116 and flow from storage tank 1118 is blocked. Valve 1115 B is set so that water from filter 1111 flows to storage tank 1118 and is blocked from flowing to hot 1119 and cold 1120 water dispensing means.

When a sufficient volume of water has accumulated in accumulator 11112 and accessory tank 1123, if there is sufficient unused volume available in storage tank 1118, the control system changes its operating state to condition 2. If the water level in storage tank 1118 is below a specified amount and the rate of local water production is below a specified threshold rate, the control system changes its operating state to condition 3.

Condition 2: (STORE LOCALLY GENERATED WATER)

This condition takes effect when locally generated water is available as indicated by a sufficiently high level in the accessory tank 1123, and there is adequate storage available in storage tank 1118.

Valve 1115 A is set so that water flows from the accessory tank 1123 to the pump 11116 and flow from storage tank 1118 is blocked.

Valve 1115 B is set so that water from filter 1111 flows to storage tank 1118 and is blocked from flowing to hot 1119 and cold 1120 water dispensing means.

Water from the accessory tank 1123 is pumped by pump 11116 through filters 11119, 1110, 1111, and up to the storage tank 1118 until the water level in accessory tank 1123 decreases to a predetermined level.

Condition 3: (STORE EXTERNAL WATER)

This condition takes effect when locally generated water is not available as indicated by an insufficiently high level in the accessory tank 1123 accompanied by various other sensed conditions precluding a rise in the level of water in accessory tank 1123 before more water is needed in storage tank 1118, and there is adequate storage available in storage tank 1118.

Valve 1115 A is set so that water flows from the accessory tank 1123 to the pump 11116 and flow from storage tank 1118 to pump 11116 is blocked. Check valve 1125B prevents reverse flow through pump 11116.

Valve 1115 B is set so that water from filter 1111 flows to storage tank 1118 and is blocked from flowing to hot 1119 and cold 1120 water dispensing means. Valve 1124A is opened. Water from external source 1116 flows under externally supplied pressure through filters 11119, 1110, 1111, and up to the storage tank 1118.

Condition 4: (DISPENSE WATER)

When the user signals the control system to dispense water, condition 4 becomes operative. Condition 4 takes precedence other all other conditions and causes their immediate, orderly termination.

Valve 1115 A is set so that water flows from the storage tank 1118 to the pump 11116 and flow from the accessory tank 1123 is blocked.

Valve 1115 B is set so that water from filter 1111 flows to hot 1119 and cold 1120 water dispensing means and is blocked from flowing to storage tank 1118. Solenoid valve 1124 E, 1124 F, or 1124 G is opened to correspond with the user's selection of water temperature and solenoid valves 1124 D and 1124 H are closed.

Entry into condition 4 will be disallowed if storage tank 1118 holds less than a predetermined volume of water; if any of filters 11119, 1110, or 1111 has exceeded its effective life either in time elapsed since replacement or volume of water processed; or for other system failures such as a failure in the ozone generating and dispensing sub-system.

Condition 5: (RECIRCULATE TEMPERATURE CONDITIONED WATER)

When operating conditions, including the passage of time and amount of water dispensed dictate, the control system causes the recirculation of temperature conditioned water, and condition 5 becomes operative.

Valve 1115 A is set so that water flows from the storage tank 1118 to the pump 11116 and flow from the accessory tank 1123 is blocked.

Valve 1115 B is set so that water from filter 1111 flows to the hot 1119 storage tank and is blocked from flowing to storage tank 1118 and solenoid valve 1124 C is opened so that water flows into the cold storage tank 1120.

Pump 11116 is activated and water recirculates through the temperature conditioning tanks and the filters.

Condition 6: (RECIRCULATE STORED WATER)

When operating conditions, including the passage of time and amount of water dispensed dictate, the control system causes the recirculation of stored water, and condition 6 becomes operative.

Valve 1115 A is set so that water flows from the storage tank 1118 to the pump 11116 and flow from the accessory tank 1123 is blocked.

Valve 1115 B is set so that water from filter 1111 flows to storage tank 1118 and is blocked from flowing to the hot 1119 tank. Solenoid valve 1124 C is closed so that water does not flow into the cold storage tank 1120.

Pump 11116 is activated and water recirculates through the storage tank 1118 and the filters.

Where a fluid flow is indicated as controlled by one or more solenoid valves, it should be understood that the various single, double, or triple acting solenoid valves shown in the figures and referred to in the descriptions are presented for simplicity and that the intent is to include any combination or combinations of more complex valves and/or piping that achieve the same effect.

FIG. 6 schematically depicts air humidification system 100. System 100 increases the dew point of ambient air before it contacts the fluid-air heat exchanger. One result is that since the air now has a higher dew point the cooled surface does not need to be cooled to as low a temperature; the system can even be used with air that has dew points at or below freezing. System 100 includes air blower 106 that bubbles ambient air 110 through standing water 112 in tank 102; in this non-limiting example the bubbling is accomplished via air stone 108. Additionally or alternatively, system 100 includes spray nozzle 116 that sprays water into the air inside of tank 102. As yet another alternative, the humidification can be accomplished by spraying water into the air without the use of a tank, e.g., into a duct through which the air is conveyed.

At the start of the operation, the tank can be partially filled with potable water. Then, at least some of the surfaces of tank 102, preferably all of the surfaces above the standing water level as well as air exit 104, are cooled. Cooling can take place using any means of cooling, whether being the thermal separation devices described above or other cooling means such as a traditional compressor-based refrigeration system. When the humidified air contacts the cooled surfaces, water droplets 114 condense. Water can then be removed from tank 102 and used as potable water, in manners as described above.

What is claimed is:

1. A water production, storage, filtration, and delivery system, comprising:
   a thermal separation device that defines a cold region and a hot region;
   a first liquid-based heat exchanger coupled to the cold region of the thermal separation device;
   a second liquid-based heat exchanger coupled to the hot region of the thermal separation device;
   a first liquid-air heat exchanger located remotely from the thermal separation device and exposed to air;
   a first pumped liquid circulation loop that thermally connects the first liquid-based heat exchanger to the first liquid-air heat exchanger so as to cool the first liquid-air heat exchanger and condense water from ambient air;
   an accumulator tank that receives the condensed water and has an outlet;
   an accessory tank with a water inlet that is fluidly coupled to the outlet of the accumulator tank such that the condensed water in the accumulator tank and the accessory tank are at the same water level, where the accessory tank has a water outlet;
   a water holding tank that stores water;
   a water level sensor that is configured to sense a level of the condensed water in the accessory tank that is also indicative of a level of the condensed water in the accumulator tank;
   a first system water outlet;
   one or more first water filters in a fluid path between the accumulator tank and the water holding tank;
   one or more second water filters in a fluid path between the water holding tank and the first water system outlet;
   a first water pump with an inlet fluidly coupled to both the accessory tank outlet and the water holding tank, and with an outlet fluidly coupled to both the first system water outlet and the water holding tank;
   a water purification process that purifies at least the condensed water; and
   a controller that is operatively coupled to the water level sensor and the first water pump, where the controller is enabled to control at least a system idle condition, which allows recirculation or a filtration process, and a dispense water condition;
   wherein in the system idle condition the controller monitors, in response to the water level sensor, an amount of water, and in the dispense water condition the controller causes water to be dispensed from the first system water outlet.

2. The system of claim 1, wherein the water purification process comprises one or more of filtration, ozonation, and electromagnetic radiation.

3. The system of claim 1, wherein the thermal separation device comprises a thermoelectric device.

4. The system of claim 1, wherein the controller controls a flow of air over the first liquid-air heat exchanger to maintain the condensing element below the dew point of the air.

5. The system of claim 1, wherein the controller controls the temperature of the first liquid-air heat exchanger by controlling the voltage, current, or power applied to the thermal separation device.

6. The system of claim 1, wherein power is applied to the thermal separation device, and wherein the controller controls the power via pulse-width modulation of a power supply.

7. The system of claim 1, further comprising an inlet from an external source of pressurized water, and a one-way check valve that is configured to prevent the external pressurized water from flowing in a reverse direction.

8. The system of claim 1, wherein the one or more first water filters and the one or more second water filters comprise at least a sediment filter, a carbon block filter, and an ultrafilter.

9. The system of claim 1, further comprising a heated water reservoir and a refrigerated water reservoir.

10. The system of claim 9, wherein all of the filters, the accumulator tank, the accessory tank, the heated water reservoir, the refrigerated water reservoir, and any piping used to carry water is subjected to one or more of electromagnetic radiation and chemical injection.

11. The system of claim 1, further comprising an injection system that injects one or more of gas and a chemical into the condensed water.

12. The system of claim 1, further comprising a sediment filter and /or strainer that the condensed water passes through before entering the accumulator tank, wherein the accumulator tank and the sediment filter and /or the strainer contains or is coated with an antibacterial agent.

13. The system of claim 7, wherein the water holding tank comprises a cold-water storage tank for storing the condensed water and an ambient temperature water storage tank for storing the external pressurized water, wherein the cold-water storage tank is incorporated into the ambient temperature water storage tank, wherein the cold-water storage tank and the ambient temperature water storage tank are separated by a liquid-permeable baffle.

14. The system of claim 1, further comprising an environmental thermal exchanger that is thermally connected to the hot region of the thermal separation device by a closed circulation process.

15. The system of claim 1, further comprising a quick-disconnect fitting with a check valve located in the fluid path between the accumulator tank and the accessory tank, and configured to allow the accumulator tank to be removed without loss of water in the accessory tank or the water holding tank.

\* \* \* \* \*